(12) United States Patent
Gross et al.

(10) Patent No.: US 9,201,619 B2
(45) Date of Patent: Dec. 1, 2015

(54) METHODS AND SYSTEMS FOR ASSIGNING A JOB SOURCE TO A HUB IN A PRINT PRODUCTION ENVIRONMENT

(71) Applicant: Xerox Corporation, Norwalk, CT (US)

(72) Inventors: Eric Michael Gross, Rochester, NY (US); Sudhendu Rai, Fairport, NY (US); Jack Gaynor Elliot, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/158,092

(22) Filed: Jan. 17, 2014

(65) Prior Publication Data

US 2015/0205555 A1  Jul. 23, 2015

(51) Int. Cl.
*G06K 15/02* (2006.01)
*G06F 3/12* (2006.01)

(52) U.S. Cl.
CPC .............. *G06F 3/1263* (2013.01); *G06F 3/122* (2013.01)

(58) Field of Classification Search
CPC .............................................. G06F 2206/1504
See application file for complete search history.

(56) References Cited

U.S. PATENT DOCUMENTS

| | | | |
|---|---|---|---|
| 2004/0190057 A1* | 9/2004 | Takahashi et al. | 358/1.15 |
| 2007/0153311 A1* | 7/2007 | Carling et al. | 358/1.13 |
| 2008/0162240 A1* | 7/2008 | Brock et al. | 705/8 |
| 2009/0021775 A1 | 1/2009 | Rai | |
| 2009/0025002 A1 | 1/2009 | Rai | |
| 2009/0043628 A1* | 2/2009 | Gombert | 705/8 |
| 2009/0313060 A1* | 12/2009 | Evevsky | 705/7 |
| 2010/0253968 A1* | 10/2010 | Nuggehalli | 358/1.15 |
| 2012/0154850 A1* | 6/2012 | Zhao et al. | 358/1.15 |
| 2012/0320408 A1* | 12/2012 | Evevsky | 358/1.15 |
| 2014/0092424 A1* | 4/2014 | Grosz | 358/1.15 |

FOREIGN PATENT DOCUMENTS

JP   2013-156952   *   8/2013   .............. G06F 3/12

* cited by examiner

*Primary Examiner* — Beniyam Menberu
(74) *Attorney, Agent, or Firm* — Fox Rothschild LLP

(57) ABSTRACT

A method of assigning a hub to a job source may include identifying one or more job sources where one or more print jobs are received, identifying one or more hubs to which the print jobs can be sent to be processed, determining a processing cost for each unique pair of job sources and hubs, creating, by a computing device, a job source list by identifying the pair associated with the largest processing cost, assigning the job source of the identified pair a highest position in the job source list, and repeating the identifying and the assigning for a next highest position until all identified job sources are assigned, and assigning the job source having the highest position in the job source list to an associated hub having a lowest processing cost.

18 Claims, 4 Drawing Sheets

METHODS AND SYSTEMS FOR ASSIGNING A JOB SOURCE TO A HUB IN A PRINT PRODUCTION ENVIRONMENT

BACKGROUND

Routing jobs to centralized hubs from remote locations, such as, for example, retail stores, is an important process in certain systems—manufacturing and transportation systems to name a few. It is often difficult to recommend routes because performance analytics are not usually known in advance. As such, multiple performance analytics are considered simultaneously, which often results in delays or inefficiencies.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of assigning a hub to a job source may include identifying one or more job sources where one or more print jobs are received, identifying one or more hubs to which the print jobs can be sent to be processed, determining a processing cost for each unique pair of job sources and hubs, creating, by a computing device, a job source list by identifying the pair associated with the largest processing cost, assigning the job source of the identified pair a highest position in the job source list, and repeating the identifying and the assigning for a next highest position until all identified job sources are assigned, and assigning the job source having the highest position in the job source list to an associated hub having a lowest processing cost.

In an embodiment, a system for assigning a hub to a job source may include a computing device, and a computer-readable storage medium in communication with the computing device. The computer-readable storage medium may include one or more programming instructions that, when executed, cause the computing device to identify one or more job sources where one or more print jobs are received, identify one or more hubs to which the print jobs can be sent to be processed, determine a processing cost for each unique pair of job sources and hubs, create a job source list by identifying the pair associated with the largest processing cost, assigning the job source of the identified pair a highest position in the job source list, and repeating the identifying and the assigning for a next highest position until all identified job sources are assigned, and assign the job source having the highest position in the job source list to an associated hub having a lowest processing cost.

DETAILED DESCRIPTION

Figure 1:
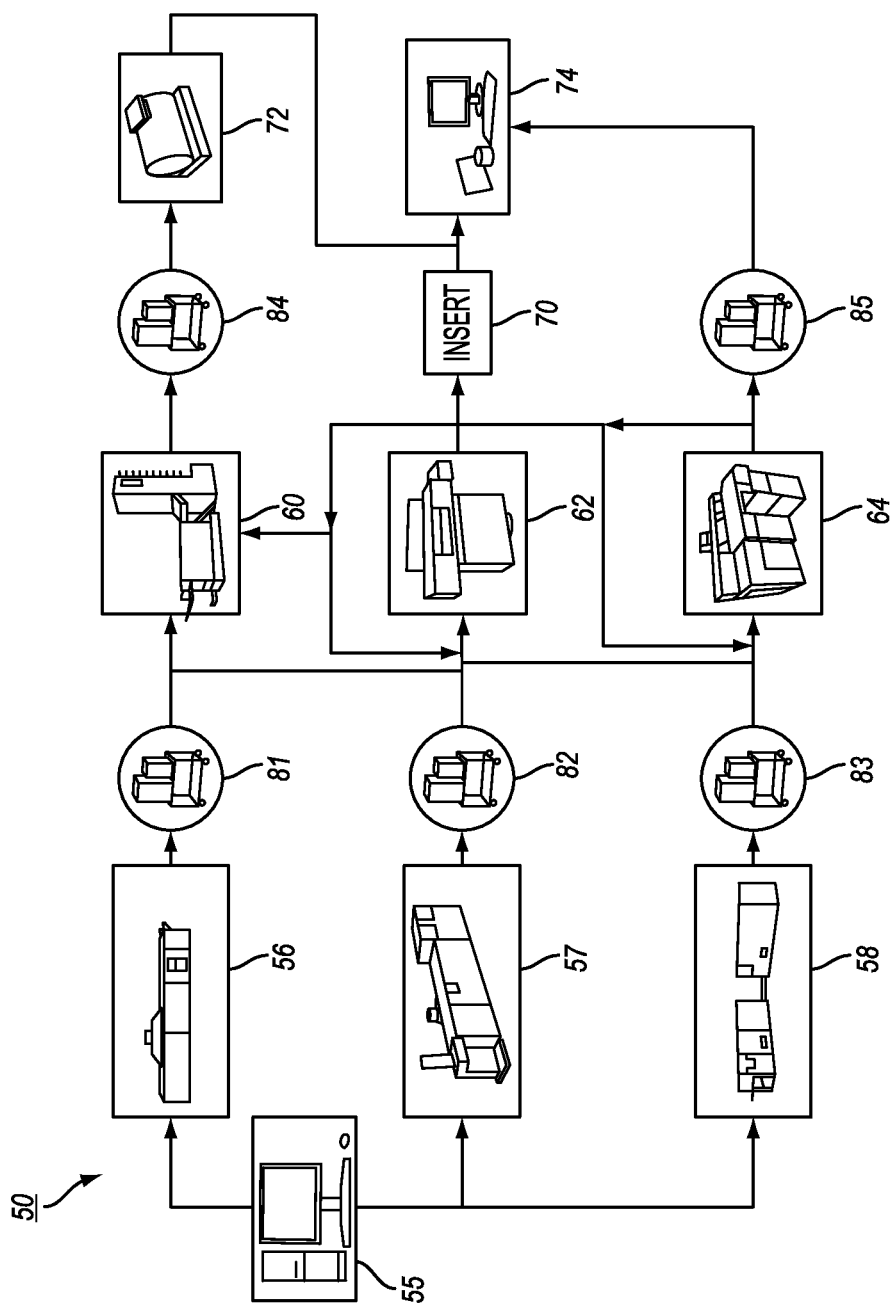
FIG. 1 illustrates an example of a production environment according to an embodiment.

The following terms shall have, for purposes of this application, the respective meanings set forth below:

A "computing device" refers to a device that includes a processor and tangible, computer-readable memory. The memory may contain programming instructions that, when executed by the processor, cause the computing device to perform one or more operations according to the programming instructions. As used in this description, a "computing device" may be a single device, or any number of devices having one or more processors that communicate with each other and share data and/or instructions. Examples of computing devices include personal computers, servers, mainframes, gaming systems, televisions, and portable electronic devices such as smartphones, personal digital assistants, cameras, tablet computers, laptop computers, media players and the like.

A "hub" refers to a central location to which one or more jobs are routed for processing. A hub may include one or more computing devices that are configured to receive one or more jobs to be processed from one or more computing devices associated with one or more job sources.

A "job" refers to a logical unit of work that is to be completed for a customer. For example, in a print production environment, a job may include one or more print jobs from one or more clients. For example, a job in a vehicle production environment may include manufacturing a vehicle or a portion thereof. As another example, a job in a chemical production environment may include producing or processing a chemical product or a portion thereof. Similarly, a job in a computing device production environment may be to manufacture a computing device or a portion thereof such as, for example, a printer, a scanner or a copier.

A "job source" refers to a location from which one or more jobs are routed. A job source may include one or more computing devices that may be used to route one or more jobs to a computing device associated with a hub.

A "print job" refers to a job processed in a print shop. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "production device" refers to a device used to process at least a portion of a job. Examples of production devices in a print shop may include, without limitation, printers, inserters, binders, punchers, collators, multi-function devices or other similar equipment and/or the like.

A "production environment" refers to machine and/or human labor used to complete one or more jobs. A production environment may include one or more devices or other equipment that may be used to complete one or more jobs. Example production environments may include, without limitation, a print production environment, a chemical production environment, a vehicle production environment, a computing device manufacturing production environment, and/or other manufacturing production environments.

A production environment may include one or more autonomous production cells that each may include one or more production devices. In an embodiment, a cell may include one or more devices that are capable of delivering at least one type of job. For example, in a print shop, a cell may include production devices such as, for example, multiple printers, a shrink-wrapper and a computerized control system. A different cell may include printers, cutters and copiers. In an embodiment, print jobs may be intelligently routed to cells to provide desired load balancing and/or throughput. The use of cells may help decrease the amount of work in progress and labor and inventory costs associated with processing jobs, and may increase the utilization of the production devices in a production environment.

FIG. 1 shows an example of a production environment 50, in this case, example elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Figure 2:
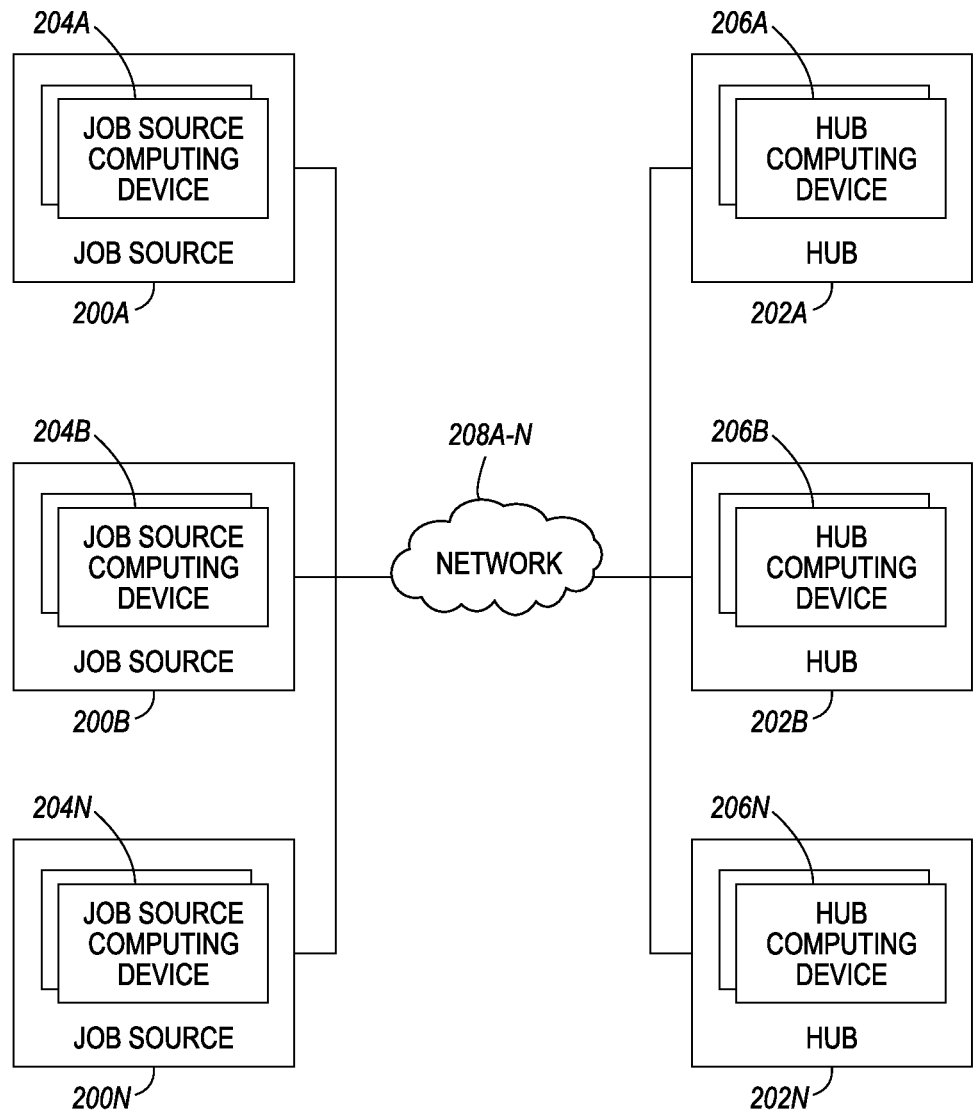
FIG. 2 illustrates an example production system according to an embodiment.

FIG. 2 illustrates an example production system according to an embodiment. As illustrated by FIG. 2, a production system may include one or more job sources 200a-N and one or more hubs 202a-N. A job source may be a location from which one or more jobs originate and are sent to a hub. A job source may be a retail establishment or other location.

In an embodiment, each job source 200a-N may be associated with one or more job source computing devices 204a-N that may communicate with one or more hub computing devices 206a-N associated with the one or more hubs 202a-N via one or more networks 208a-N. A job source computing device 204a-N may be a computing device configured to send one or more jobs to a hub computing device 206a-N. Examples of a job source computing device 204a-N may include without limitation, a laptop computer, a desktop computer, a tablet, a mobile device, a server, a mainframe or other computing device.

A hub computing device 206a-N may be a computing device configured to receive and/or process at least a portion of one or more jobs from one or more job source computing devices 204a-N. Examples of a hub computing device 206a-N may include without limitation, a laptop computer, a desktop computer, a tablet, a mobile device, a server, a mainframe or other computing device.

In an embodiment, a communication network 208a-N may be a local area network (LAN), a wide area network (WAN), a mobile or cellular communication network, an extranet, an intranet, the Internet and/or the like. In an embodiment, a communication network 208a-N may provide communication capability between one or more job source computing devices 204a-N and one or more hub computing devices 206a-N.

In an embodiment, a hub 202a-N may be a location that receives information pertaining to one or more jobs from one or more job sources 200a-N. A hub 202a-N may be a production environment and/or the like. In an embodiment, a hub 202a-N may return a completed job to the job source 200a-N from which it was received upon completion. For example, the job sources 200a-N in FIG. 2 may represent a plurality of retail locations at which orders for print jobs may be received, and the hubs 202a-N in FIG. 2 may represent production centers which process print job orders. A job source 200a-N may receive an order for a job, and may send information pertaining to the job to a hub 202a-N. The hub 202a-N may process the job, and may return the completed job to the job source 200a-N. In an embodiment, job sources 200a-N and/or hubs 202a-N may be geographically distributed. For example, job sources 200a-N and/or hubs may be located in different towns, cities, states, countries, regions or other areas.

According to certain embodiments, a job source 200a-N may not incur a cost or may incur a minimal cost in sending a print job to a hub 202a-N. For example, a job source 200a-N may electronically send a job to a hub 202a-N, so the cost of such transmission may be minimized. However, there may be a cost associated with sending a completed job from a hub 202a-N back to a job source 200a-N. For instance, a job order may be to print ten copies of a document. Once a hub 202a-N processes the order, the ten document copies may be shipped back to the job source 200a-N. A cost may be associated with such shipping.

In an embodiment, shipping cost may be directly related to the distance between a job source and a hub. For instance, it may be assumed that the shipping cost associated with a shipment from a hub to a job source that are relatively close to one another is less than the shipping cost associated with a shipment from a hub to a job source that are located further from one another. In another embodiment, shipping cost may be related to a region associated with a job source and/or a hub. These costs may be tabulated or calculating using one or more algorithms.

Figure 3:
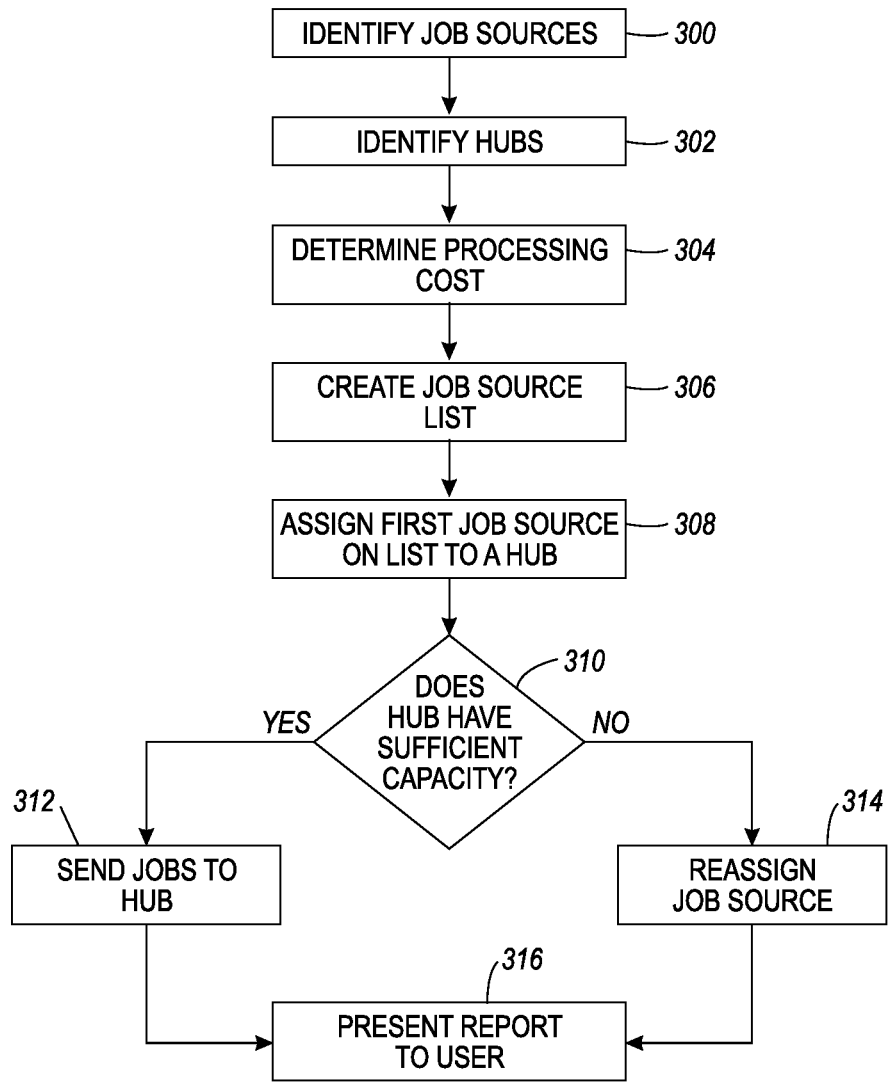
FIG. 3 illustrates an example method of determining which hub a particular job source should send a job according to an embodiment.

FIG. 3 illustrates an example method of determining which hub a particular job source should send a job according to an embodiment. The described method assumes that a job from a job source is assigned to only one hub, and that for a given job source to hub assignment, performance metrics such as, for example, job lateness or work-in-progress, are monotonic with the job's volume. The method may also assume that each hub is associated with a cost per unit of production when operating at a certain utilization level. Therefore, some hubs may be more expensive than others when operating at a common percentage of maximum utilization.

In an embodiment, the method may assume that the maximum capacity in units produced per unit time is known for each hub, and that each job source has the same distribution of jobs that is sent to a hub. As such, the difference between job sources may be in the quantity of jobs, but not the underlying distribution of jobs. In other words, it may be assumed that certain job sources produce more volume than other job sources.

As illustrated by FIG. 3, one or more job sources may be identified 300, and one or more hubs may be identified 302. A processing cost associated with one or more pairs of hubs and job sources may be determined 304. A processing cost may represent the cost of processing a job source's jobs at a particular hub over a certain period of time. In an embodiment, a processing cost may include both the cost per unit of production for processing a job as well as the cost of shipping the completed job from the hub back to the job source. Table 1 illustrates example processing costs (in thousands of dollars) for example job source/hub combinations over a certain period of time according to an embodiment. For instance, referring to Table 1, the processing cost associated with Hub 1 processing Job Source 5's jobs over a time period is $10,000.

TABLE 1

|  | Hub 1 | Hub 2 | Hub 3 |
|---|---|---|---|
| Job Source 1 | 8 | 10 | 9 |
| Job Source 2 | 10 | 10 | 18 |
| Job Source 3 | 13 | 13 | 13 |
| Job Source 4 | 4 | 14 | 13 |
| Job Source 5 | 10 | 15 | 13 |
| Job Source 6 | 6 | 17 | 17 |
| Job Source 7 | 5 | 15 | 16 |
| Job Source 8 | 6 | 12 | 12 |
| Job Source 9 | 6 | 10 | 19 |
| Job Source 10 | 9 | 8 | 11 |

In an embodiment, it may be assumed that the revenue per unit work does not differ among job sources or hubs, so the arrangement that results in a minimum cost yields the maximum profit.

In an embodiment, a processing cost may be determined 304 by analyzing historical processing costs for one or more pairs of job sources and hubs over a past time period. In another embodiment, a processing cost may be estimated or modeled based on historical jobs, anticipated or expected future jobs and/or the like.

In an embodiment, a job source list may be created 306. The job source list may include the identified job source ordered from highest cost to lowest processing cost. For example, the job associated with the highest processing cost, regardless of the associated hub, may be included at the top of the list. Referring to Table 1, Job Source 9 is associated with the highest processing cost (i.e., $19,000), so the processing costs associated with Job Source 9 across Hub 1, Hub 2 and Hub 3 may be included first on the job source list. Table 2 illustrates an example job source list corresponding to the job source/hub combinations identified in Table 1.

TABLE 2

|  | Hub 1 | Hub 2 | Hub 3 |
|---|---|---|---|
| Job Source 9 | 6 | 10 | 19 |
| Job Source 2 | 10 | 10 | 18 |
| Job Source 6 | 6 | 17 | 17 |
| Job Source 7 | 5 | 15 | 16 |
| Job Source 5 | 10 | 15 | 13 |
| Job Source 4 | 4 | 14 | 13 |
| Job Source 3 | 13 | 13 | 13 |
| Job Source 8 | 6 | 12 | 12 |
| Job Source 10 | 9 | 8 | 11 |
| Job Source 1 | 8 | 10 | 9 |

The purpose of ordering the job sources in this manner is so the job sources having the potential for incurring the highest processing cost are considered first. This is a heuristic that attempts to assign job sources to hubs that have the greatest potential for adversely impacting cost. Prioritizing such Job Sources provides greatest flexibility in suitably assigning them since capacity at the start of the assignment task is readily available. This approach may not produce an optimal solution, but it may yield a locally optimal choice at each stage.

In an embodiment, jobs associated with the first job source on the job source list may be assigned 308 to the hub having the lowest processing cost. For example, referring to Table 2, jobs associated with Job Source 9 may be assigned 308 to Hub 1.

It may be determined 310 whether the assigned hub has sufficient capacity to handle the assigned job(s). In an embodiment, a maximum capacity for one or more hubs may be estimated. A maximum capacity may represent a job volume that a hub is capable of processing during a time period. A hub may have sufficient capacity to handle an assigned job or jobs if doing so would not extend the hub beyond its maximum capacity. Table 3 illustrates example maximum capacities (in thousands of pages) over a period of time for the hubs illustrated in Table 1 and Table 2 according to an embodiment.

TABLE 3

| Hub | Capacity |
|---|---|
| Hub 1 | 100 |
| Hub 2 | 214 |
| Hub 3 | 98 |
| Hub 4 | 450 |
| Hub 5 | 125 |
| Hub 6 | 380 |
| Hub 7 | 400 |
| Hub 8 | 320 |
| Hub 9 | 250 |
| Hub 10 | 315 |

For example, Job Source 9 may receive a job having a total volume of 10,000 pages. Hub 1 may have sufficient capacity to process this job if its current job volume is less than or equal to 90,000 pages (per the unit of time under consideration).

If the assigned hub has sufficient capacity, then the job source may be associated 312 with the assigned hub, and jobs received by the job source may be sent to the assigned hub. If the assigned hub does not have sufficient capacity, the job source may be reassigned 314 to a different hub. In an embodiment, the job source may be reassigned 314 to the hub having the next lowest processing cost. Referring back to the above example, if Hub 1 does not have sufficient capacity to process jobs from Job Source 9, then Job Source 9 may be reassigned to Hub 2 because Hub 2 is associated with the next lowest processing cost. This reassignment process may be repeated until a hub having sufficient capacity is found or all possible hub options are exhausted. If each possible hub has insufficient capacity, then no solution may exist. In this situation, an operator, administrator, or system may consider efforts to increase hub capacities In an embodiment, once a job source is assigned to a hub, the process described above may be repeated for one or more other job sources on the job source list to determine to which hub the job source should be assigned to.

In an embodiment, a report of the determined hub assignments may be presented 316 to a user. A report may include a listing of one or more job sources and its corresponding hub. Other information, such as the current capacity of one or more hubs, the maximum capacity of one or more hubs, the volume of one or more jobs, the processing cost associated with one or more job source/hub pairs and/or the like may be included in the report. The report may be printed, faxed or presented to a user electronically such as via email or displayed on a user interface of a computing device.

Figure 4:
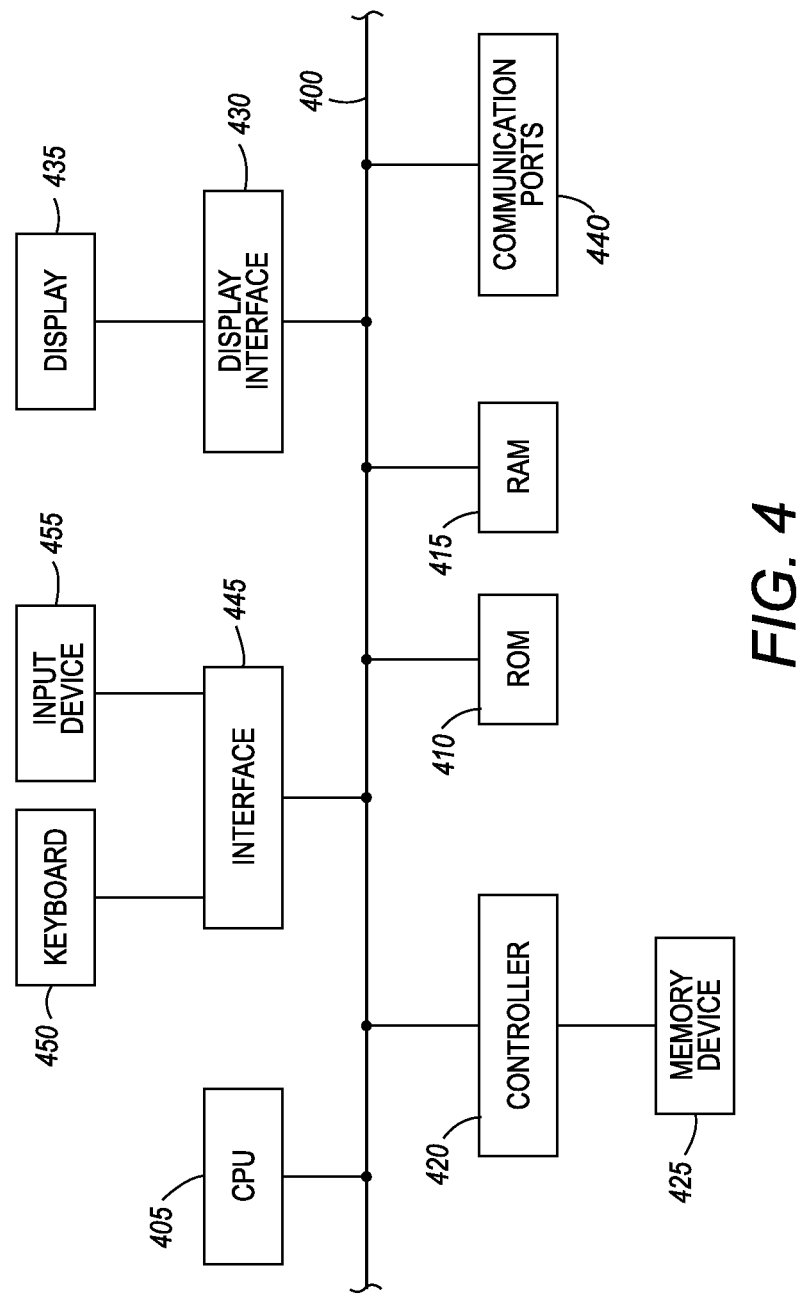
FIG. 4 illustrates a block diagram of example hardware that may be used to contain or implement program instructions according to an embodiment.

FIG. 4 depicts a block diagram of hardware that may be used to contain or implement program instructions. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an example of a production device, computing device or processor as such terms are used within this disclosure. Read only memory (ROM) 410 and random access memory (RAM) 415 constitute examples of non-transitory computer-readable storage media.

A controller 420 interfaces with one or more optional non-transitory computer-readable storage media 425 to the system bus 400. These storage media 425 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 410 and/or the RAM 415. Optionally, the program instructions may be stored on a tangible non-transitory computer-readable medium such as a compact disk, a digital disk, flash memory, a memory card, a USB drive, an optical disc storage medium and/or other recording medium.

An optional display interface 430 may permit information from the bus 400 to be displayed on the display 435 in audio, visual, graphic or alphanumeric format. Communication with external devices, such as a printing device, may occur using various communication ports 440. A communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of assigning a hub to a job source, the method comprising:
   identifying one or more job sources where one or more print jobs are received;
   identifying one or more hubs to which the print jobs can be sent to be processed;
   determining a processing cost for each unique pair of job sources and hubs by:
      determining a cost of processing the job source's jobs at the hub over a period of time,
      determining a cost of shipping a completed job from the hub to the job source, wherein the cost of shipping is based on a geographical proximity between the job source and the hub, and
      summing the cost of processing and the cost of shipping;
   creating, by a computing device, a job source list by:
      identifying the pair associated with the largest processing cost,
      assigning the job source of the identified pair a highest position in the job source list, and
      repeating the identifying and the assigning for a next highest position until all identified job sources are assigned; and
   assigning the job source having the highest position in the job source list to an associated hub having a lowest processing cost.

2. The method of claim 1, wherein determining a processing cost comprises analyzing historical processing costs for one or more of the pairs of job sources and hubs over a past time period.

3. The method of claim 1, wherein the processing cost comprises one or more of the following:
   a cost per unit production for processing a print job; and
   a shipping cost.

4. The method of claim 1, further comprising:
   determining whether the identified hub has sufficient capacity to process a print job from the job source having the highest position in the job source list; and
   in response to determining that the identified hub has sufficient capacity, sending at least a portion of the print job to the identified hub to be processed.

5. The method of claim 4, wherein determining whether the identified hub has sufficient capacity comprises:
   identifying a current capacity of the identified hub;
   identifying a maximum capacity of the identified hub;
   determining whether processing the print job would increase the current capacity to exceed the maximum capacity; and
   in response to determining that processing the print job would not increase the current capacity to exceed the maximum capacity, determining that the identified hub has sufficient capacity.

6. The method of claim 1, further comprising:
   determining whether the identified hub has sufficient capacity to process a print job from the job source having the highest position in the job source list; and
   in response to determining that the identified hub does not have sufficient capacity, reassigning the job source having the highest position in the job source list to an associated hub having a next lowest processing cost.

7. The method of claim 1, wherein determining whether the identified hub has sufficient capacity comprises:
   identifying a current capacity of the identified hub;
   identifying a maximum capacity of the identified hub;
   determining whether processing the print job would increase the current capacity so that exceeds the maximum capacity; and
   in response to determining that processing the print job would increase the current capacity to exceed the maximum capacity, determining that the identified hub does not have sufficient capacity.

8. The method of claim 1, further comprising:
   assigning the job source having a next highest position in the job source list to an associated hub having a lowest processing cost.

9. The method of claim 1, further comprising presenting a user with a report comprising one or more of the following:
   an indication of which of the identified job sources were assigned to which of the identified hubs; and
   one or more processing costs associated with one or more of the pairs of job sources and hubs.

10. A system for assigning a hub to a job source, the system comprising:
    a computing device; and
    a computer-readable storage medium in communication with the computing device, wherein the computer-readable storage medium comprises one or more programming instructions that, when executed, cause the computing device to:

identify one or more job sources where one or more print jobs are received, identify one or more hubs to which the print jobs can be sent to be processed, determine a processing cost for each unique pair of job sources and hubs by:

determining a cost of processing the job source's jobs at the hub over a period of time, determining a cost of shipping a completed job from the hub to the job source, wherein the cost of shipping is based on a geographical proximity between the job source and the hub, and summing the cost of processing and the cost of shipping, create a job source list by:

identifying the pair associated with the largest processing cost, assigning the job source of the identified pair a highest position in the job source list, and repeating the identifying and the assigning for a next highest position until all identified job sources are assigned, and assign the job source having the highest position in the job source list to an associated hub having a lowest processing cost.

11. The system of claim 10, wherein the one or more programming instructions that, when executed, cause the computing device to determine a processing cost comprise one or more programming instructions that, when executed, cause the computing device to analyze historical processing costs for one or more of the pairs of job sources and hubs over a past time period.

12. The system of claim 10, wherein the processing cost comprises one or more of the following:

a cost per unit production for processing a print job; and
a shipping cost.

13. The system of claim 10, wherein the computer-readable storage medium further comprises one or more programming instructions that, when executed, cause the computing device to:

determine whether the identified hub has sufficient capacity to process a print job from the job source having the highest position in the job source list; and in response to determining that the identified hub has sufficient capacity, send at least a portion of the print job to the identified hub to be processed.

14. The system of claim 13, wherein the one or more programming instructions that, when executed, cause the computing device to determine whether the identified hub has sufficient capacity comprise one or more programming instructions that, when executed, cause the computing device to:

identify a current capacity of the identified hub;
identify a maximum capacity of the identified hub;
determine whether processing the print job would increase the current capacity to exceed the maximum capacity; and in response to determining that processing the print job would not increase the current capacity to exceed the maximum capacity, determining that the identified hub has sufficient capacity.

15. The system of claim 10, wherein the computer-readable storage medium further comprises one or more programming instructions that, when executed, cause the computing device to:

determine whether the identified hub has sufficient capacity to process a print job from the job source having the highest position in the job source list; and in response to determining that the identified hub does not have sufficient capacity, reassign the job source having the highest position in the job source list to an associated hub having a next lowest processing cost.

16. The system of claim 10, wherein the one or more programming instructions that, when executed, cause the computing device to determine whether the identified hub has sufficient capacity comprise one or more programming instructions that, when executed, cause the computing device to:

identify a current capacity of the identified hub;
identify a maximum capacity of the identified hub;
determine whether processing the print job would increase the current capacity to exceed the maximum capacity; and in response to determining that processing the print job would increase the current capacity to exceed the maximum capacity, determine that the identified hub does not have sufficient capacity.

17. The system of claim 10, wherein the computer-readable storage medium further comprises one or more programming instructions that, when executed, cause the computing device to assign the job source having a next highest position in the job source list to an associated hub having a lowest processing cost.

18. The system of claim 10, wherein the computer-readable storage medium further comprises one or more programming instructions that, when executed, cause the computing device to present a user with a report comprising one or more of the following:

an indication of which of the identified job sources were assigned to which of the identified hubs; and one or more processing costs associated with one or more of the pairs of job sources and hubs.

* * * * *